United States Patent Office 2,844,444
Patented July 22, 1958

2,844,444

PROCESS OF PELLETIZING METAL SILICATES

Merrill E. Jordan, Walpole, Mass., assignor to Godfrey L. Cabot, Inc., Boston, Mass., a corporation of Massachusetts No Drawing. Application March 19, 1954
Serial No. 417,517

2 Claims. (Cl. 23—313)

This invention comprises a new and improved process of pelletizing metal silicates and like material which it is desired to employ in industry in an extremely fine state of subdivision.

Certain powdered materials may be agglomerated by mechanical treatment without the assistance of binders or the addition of any foreign substances. The agglomerates thus formed are of greater apparent density and less bulk than the loose powders from which they are formed and consist in more or less spherical pellets having such a high ratio of weight to surface that they are not dusty. These pellets have comparatively smooth, non-adherent surfaces and are of compact cohesive interior structure although capable of dispersion when milled into plastic masses. These characteristics give the resulting pellets a free-flowing characteristic which greatly simplifies handling in bulk and mixing with other ingredients, as well as packaging, transportation and storage problems.

Powders which normally display this capacity for agglomeration have certain other characteristics which serve to differentiate them from those powders which cannot be agglomerated by mechanical treatment alone. For example, if placed on a vibrating surface they will agglomerate into small spheres of fragile structure and will form an adhesive lump when squeezed. Carbon black is one example of an agglomerative powder which has the property in its normal commercial condition of agglomerating when subjected to turbulent agitation and may thus be converted into small tenacious spherical pellets capable of being handled and transported in bulk without substantial deterioration.

There are other fine powders, among which are included the metal silicates, which are unaffected when subjected, without supplementary treatment, to mechanical agitation. For example, wollastonite (CaSiO₃) when crushed and dry ground is a non-agglomerative powder and can be subjected to turbulent agitation for endless periods without forming pellets. It is with this class of powders which may be termed normally or naturally non-agglomerative that the present invention deals.

The present invention is based on the discovery that such non-agglomerative powders as those listed and others having similar characteristics may be rendered agglomerative by pre-treatment involving grinding of the raw material to a predetermined critical small particle size, wetting the ground particles, forming a dry cake thereof, and reducing the dried cake to the form of detritus or dusty agglomerates. When the material has been thus treated it may be readily converted to the desired pellet form by merely agitating in a revolving drum.

The process of my invention may be applied with particular advantage to the pelletizing of wollastonite. A large deposit of the raw material is found near Willsboro, New York, where it is mined and reduced to powdered form of brilliant whiteness (92–96% standard reflectance) and high chemical purity (over 98% CaSiO₃). A specific object of the present invention is to provide a practical and economic process by which wollastonite may be converted to pellet form. The invention, however, is not limited to the treatment of wollastonite, but may be advantageously utilized for pelletizing other metal silicates such, for example, as talc, $(Mg_3(OH)_2Si_4O_{10})$, powdered aluminum silicate or iron silicate, or other fine normally non-agglomerative powders not necessarily silicates such as whiting (calcium carbonate).

For purposes of illustration the process of this invention will now be described in its application to the pelletizing of wollastonite.

The raw material as shipped from treatment at the quarry is first ground to a particle size, as measured on the Fisher Subsieve Sizer at a porosity of 0.6, of less than 2.0 microns, equivalent to a surface area of at least about 1.0 square meter per gram. The Fisher Subsieve Sizer is operated by compressing a plug of the finely ground material to a designated porosity and then flowing a measured volume of air at a given pressure through the plug. The instrument is so calibrated as to indicate average particle size of any pigment regardless of its shape by permeability of the compressed plug. The approximate surface area can be calculated from the average particle diameter according to the following equation, which is derived from the geometry of spheres:

$$d_m = \frac{6 \times 10^4}{\rho S_w}$$

$$S_w = \frac{6 \times 10^4}{\rho d_m}$$

in which $d_m$ = average diameter in microns (one micron = $10^{-6}$ meters).
$\rho$ = true density of material from which the powder was made (g./cc.) (for wollastonite this is about 2.9–3.0).
$S_w$ = specific surface in sq. cm. per gm. material.

Dry powdered wollastonite reduced to this critical particle size as above set forth has an apparent density below about 30 lbs./cu. ft., usually between 25–30 lbs./cu. ft. It is next wetted and then dried, thus converting it into a coherent mass or cake. The most convenient procedure for wetting the pigment is to grind it in the presence of water since it is normally easier and more economical to obtain a fine degree of subdivision by wet methods than by strictly dry grinding. However, dry ground pigment of the proper particle size may be wetted with approximately 100% or more of its weight of water and then dried. In wet grinding a considerable excess of water is generally used, for example 150 to 200% by weight of the dry pigment and as much as 400% by weight or more can be used, though generally there is no advantage in such additional amounts. If the pigment is wetted after grinding, a wetting agent is helpful in reducing the amount of water required.

The wetter powder is then formed into a cake and dried to a moisture content of about 1 to 10%, and usually less than 3%, since wollastonite has a relatively low capacity for moisture adsorption.

The dried cake is then reduced to the form of detritus or dusty agglomerates and this may be conveniently effected by passing the material of the cake through a rather coarse screen, i. e. about 5 to 35 mesh (Tyler), preferably about a 16 mesh screen. Other similarly gentle methods of breaking up the cake are equally satisfactory. However, violent disintegration or grinding of the cake material into particles of ultimate size will yield a material which cannot be readily pelletized. The resulting residue from properly crumbling the cake comprises everything from dust to small fragments of approximately millimeter size, and all of these will, of course, be irregular in shape and easily frangible. The apparent density of this material is about 30–25 lbs./cu. ft.

The disintegrated mass thus produced usually contains 1 to 3% moisture but, whether bone dry or containing up to 10% moisture, it is readily convertible to pellet form by agitation in a rotary drum. Using a speed of rotation of about 50 R. P. M. only 15 to 30 minutes is required to form satisfactory pellets. Rotational speeds from 10 R. P. M. to 150 R. P. M. can be used but speeds of 25 to 100 R. P. M. are preferred. The apparent density of the pellets produced will run from 40 to 50 lbs./cu. ft. or somewhat higher. In size they generally run from about 1/8" maximum to 60 mesh. They are somewhat less dusty than the best carbon black pellets, and more perfectly spherical in shape and more polished and glossy in surface finish. No priming charge is required for the pelletizing step although it is desirable under some circumstances to recycle the undersized pellets and this procedure has the effect of expediting the whole pelleting process.

*Example 1.*—The critical importance of particle size in the foregoing process will be apparent from the following test data for wollastonite:

| Grade of Wollastonite | Average Diameter,[1] Microns | Surface Area,[1] m²./g. | Results from Foregoing Process |
|---|---|---|---|
| C1 | 4.4 | .44 | Only dust and irregular lumps formed by 7 to 10 hours' treatment in rotating drum. |
| P1 | 3.7 | .56 | |
| R814 | 3.0 | .69 | |
| Wollastonite Sc | 2.65 | .78 | |
| Exp. Grind | 1.5 | 1.38 | Attractive spherical pellets form within 15 to 30 minutes' treatment in rotating drum. |
| WP7 | 0.9 | 2.30 | |
| Bird Sample | 0.88 | 2.35 | |

The symbols C1, P1, etc. listed in the above example identify seven different grades of wollastonite selected for testing and differing in their average particle size from 4.4 microns in lot C1 to 0.88 microns in lot "Bird Sample."

[1] Fisher Subsieve Size at porosity of 0.6.

*Example 2.*—The critical importance of pretreating the finely divided material of less than 2.0 microns average size in accordance with my process is shown by the results of Example 1 and the following test results on wollastonite of 1.5 microns average particle size:

| | Nature of Pretreatment | Results in Rotary Drum |
|---|---|---|
| A | Straight dry-ground material (No pretreatment). | Only dust and irregular lumps formed after several hours. |
| B | Dry-ground material slurried and dried to cake, then screened through 16 mesh screen. | Attractive, remarkably uniform spherical pellets after only 20 minutes. |
| C | Dry-ground material slurried and dried to cake, then micropulverized to return to original finely subdivided state. | Only dust and irregular lumps formed after several hours. |

Having thus disclosed my invention and described in detail illustrative examples of practicing my novel process, I claim and desire to secure by Letters Patent:

1. The process of producing tenacious, dustless, free-flowing pellets of metal silicates such as wollastonite, talc, aluminum silicate and iron silicate which are naturally non-agglomerative, comprising the steps of first grinding the raw silicate to a maximum average particle size of less than 2.0 microns and an apparent density of about 25–30 lbs./cu. ft., wetting the ground silicate with at least 100% by weight of water, drying the wetted and ground silicate and thereby transforming it into a cake having a moisture content of 1 to 10%, breaking the cake into agglomerates of irregular shape and greater particle size than 2.0 microns by passing its material through a coarse screen, and then agitating the agglomerates in a revolving drum and thereby converting them to pellets having an apparent density of 40 to 50 lbs./cu. ft.

2. The process of producing tenacious, dustless, free-flowing pellets of wollastonite which comprises the steps of grinding the raw material to a maximum average particle size of less than 2.0 microns and an apparent density of about 25–30 lbs./cu. ft., wetting the ground material with at least 100% by weight of water, drying the wetted and ground material and thereby transforming it into a cake having a moisture content of 1 to 10%, breaking the cake into agglomerates of irregular shape and of greater particle size than 2.0 microns by passing its material through a coarse screen, and then agitating the powdery agglomerates in a revolving drum and thereby converting them to pellets having an apparent density of 40 to 50 lbs./cu. ft.

References Cited in the file of this patent

UNITED STATES PATENTS

| 2,107,215 | Rembert | Feb. 1, 1938 |
| 2,297,300 | Hardesty et al. | Sept. 29, 1942 |
| 2,518,211 | Wiegand et al. | Aug. 8, 1950 |
| 2,635,950 | Robinson | Apr. 21, 1953 |

OTHER REFERENCES

"Agglomeration," an article in Chemical Engineering, vol. 58, No. 10, 1951, pages 161 to 174 inclusive.

Ludwig, in "Chemical Engineering," January 1954, vol. 61, No. 1, pages 156 to 160 inclusive.

Hardesty et al., in "Agricultural Chemicals," January 1951, pages 34 to 38 inclusive, 95 and 97.

UNITED STATES PATENT OFFICE

CERTIFICATE OF CORRECTION

Patent No. 2,844,444                                                    July 22, 1958

Merrill E. Jordan

It is hereby certified that error appears in the printed specification of the above numbered patent requiring correction and that the said Letters Patent should read as corrected below.

Column 3, line 5, for "wetter" read -- wetted --; line 22, for "30-25 lbs./cu. ft." read -- 30-35 lbs./cu. ft. --.

Signed and sealed this 23rd day of September 1958.

(SEAL)
Attest:

KARL H. AXLINE

Attesting Officer

ROBERT C. WATSON

Commissioner of Patents